United States Patent Office 3,444,196
Patented May 13, 1969

---

3,444,196
METHODS OF MANUFACTURING 2,6-DICHLOROBENZAMIDE
Cornelis Johannes Schoot, Eindhoven, Netherlands, assignor to North American Philips Company, Inc., New York, N.Y., a corporation of Delaware
No Drawing. Filed Apr. 24, 1964, Ser. No. 362,496
Claims priority, application Netherlands, May 2, 1963, 292,269
Int. Cl. C07c *103/02*
U.S. Cl. 260—558     4 Claims

ABSTRACT OF THE DISCLOSURE 2,6-dichlorobenzamide is produced by the removal through heating of water and hydrochloric acid from 1-hydroxy, 2,2,6,6 - tetrachlorocyclohexane-carbonamide. Catalysts such as zinc chloride and iodine may be employed. The 2,6-dichlorobenzamide is an intermediate for the production of 2,6-dichlorobenzonitrile, a known herbicide.

---

This invention relates to a new and improved method of preparing 2,6-dichlorobenzamide.

As shown in U.S. Patent 3,027,248 and other publications, the compound 2,6-dichlorobenzonitrile has excellent herbicidal properties and is useful as an active constituent in weed killing compositions.

The extent of commercial acceptance of this compound depends in a large degree on its cost.

A principal method of preparing 2,6-dichlorobenzonitrile consists in the dehydration of 2,6-dichlorobenzamide. The cost of producing 2,6-dichlorobenzamide is therefore a key factor in the cost of 2,6-dichlorobenzonitrile. It is therefore a principal object of this invention to prepare the compound 2,6-dichlorobenzamide in a new and inexpensive manner.

This and other objects of my invention will be apparent from the description that follows.

According to my invention, I have found that 2,6-dichlorobenzamide may be manufactured in a high yield and in an inexpensive manner from the novel compound 1 hydroxy, 2,2,6,6-tetrachlorocyclohexanecarbonamide, Formula I.

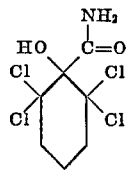

I

A method of preparing the novel compound 1-hydroxy, 2,2,6,6-tetrachlorocyclohexane-carbonamide-1 from the compound 2,2,6,6-tetrachlorocyclohexanonecyane-hydrin (Formula II) is shown in my U.S. patent application Ser. No. 362,294 filed Apr. 24, 1964 and now abandoned.

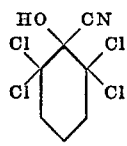

II

As shown in said patent application, the compound 2,2,6,6-tetrachlorocyclohexanonecyanehydrine is obtained by treating 2,2,6,6-tetrachlorocyclohexanone with hydrocyane. The 2,2,6,6-tetrachlorocyclohexanone may be prepared in a known manner by the chlorination of cyclohexanol.

According to my invention I have found that 2-6-dichlorobenzamide may be prepared in an inexpensive manner and in a high yield by the removal, by heating, of water and hydrochloric acid from 1-hydroxy, 2,2,6,6-tetrachlorocyclohexane-carbonamide and thereby form an aromatic ring.

Although the aromatizing reaction of the cyclo-aliphatic carbonamide may be carried out by dry heating of the substance the said reaction is preferably carried out, in order to avoid additional reactions, in a solvent. Non-polar solvents such as, for example, chlorinated or non-chlorinated aliphatic or aromatic hydrocarbons, for example xylene, monochlorobenzene, toluene, benzene, octane and ethylene chloride are preferred. Exceptionally good results are obtained with trichlorobenzene as a solvent.

It has also been found that the yields may be improved by the employment of a dehydrating catalyst. Suitable dehydrating catalysts are for example, iodine, hydriodic acid, oxalic acid, tin chloride and phthalic acid anhyride. Optimum results are obtained when using zinc chloride as the catalyst. It has been unexpectedly found that the reactions may in this case be carried out at a temperature below 150° without phenols being formed as a by-product. Preferably from 0.5 to 1 mol of zinc chloride per molecule of the carbonamide are used.

The resulting 2,6-dichlorobenzamide, if desired after previous purification, may be converted by known methods into 2,6-dichlorobenzonitrile.

My invention will now be more fully explained with reference to the following examples:

EXAMPLE (a) Manufacture of the initial material 2,2,6,6-TETRACHLOROCYCLOHEXANONECYANE HYDRINE A solution of 118 g. (0.5 mol) of 2,2,6,6-tetrachlorocyclohexanone to which 33 g. of ice-cold acidic acid have been added is introduced into a three-neckflask provided with a stirrer, a dropping funnel and a thermometer. A solution of 27 g. (0.55 mol) of NaCN in 60 ml. of water is added dropwise while maintaining the temperature between —3° C. and +3° C. After stirring for 10 minutes, the benzene layer is separated from the water layer, the water layer is extracted twice with the aid of benzene and the extracts are added to the benzene layer and dried whereafter the benzene is removed by distillation at reduced pressure. The concentrated residue, which according to an I.R. analysis, contains less than 5% of 2,2,6,6-tetrachloro-cyclohexanone, has a melting point from 125° C. to 136° C. dependent on the rate at which benzene is removed. A product having a melting point from 102° C. to 105° C. is obtained by boiling the residue in benzene for 10 minutes and then distilling off the benzene at ordinary pressure. The two modifications have in solution identical I.R. spectra. The melting point varies from 104° C. to 107° C. after recrystallization from a solvent mixture composed of 20% of benzene and 80% of petroleum ether (80° C. to 100° C).

1-HYDROXY-2,2,6,6-TETRACHLOROCYCLOHEXANE-CARBONAMIDE-1

50 g. of the cyane hydride above described in 100 ml. of concentrated H$_2$SO$_4$ are heated, while stirring, at a temperature between 55° C. and 60° C. for 1 hour and then poured out on ice. The precipitate is filtered off and washed free from acid with water. The yield is 52 g., that is, 98% with respect to the cyane hydride. The melting point of the resulting carbonamide is about 166° C. A modification having a melting point of 204°

(b) Manufacture of 2,6-dichlorobenzonitrile 2,6-DICHLOROBENZAMIDE 28.1 g. of 1-hydroxy-2,2,6,6-tetrachlorocyclohexane carbonamide-1 are dissolved in 50 ml. of 1,2,4-trichlorobenzene to which 7.5 g. of anhydrous $ZnCl_2$ are added, followed by heating while stirring. After heating at a temperature between 120° C. and 125° C. for 15 minutes the heating process is continued for half an hour at 130° C. to 135° C. By this process about 95% of the theoretical amount of HCl have escaped. After cooling, the solvent is decanted and the black-colored oil-like reaction product boiled with hydrochloric acid to remove the $ZnCl_2$. The yield of crude product was 32 g. 2,6-dichlorobenzamide having a melting point of 201° C. may be obtained with a yield of 58% by recrystallization from benzene.

2,6-DICHLORO-BENZONITRILE

For the manufacture of the nitrile, use may be made of the crude oil-like reaction product without previously removing the zinc chloride. The conversion of the amide into the nitrile in itself is a known reaction for which several dehydrating agents may be used such, for example, as $PCl_5$, $P_2O_5$, $POCl_3$. By heating the non-purified oil-like reaction products at about 105° C. for 1 hour, after adding 15 gms. of $POCl_3$, an amount of 12 g. of 2,6-dichlorobenzonitrile is obtained after steam distillation.

While I have described my invention in connection with specific embodiments and applications, other modifications thereof will be readily apparent to those skilled in this art without departing from the spirit and scope of the invention as defined in the appended claims.

What I claim is:
1. The method of manufacturing 2,6-dichlorobenzamide comprising heating 1-hydroxy-2,2,6,6-tetrachlorocyclohexane-carbonamide-1, in the presence of a catalyst selected from the group consisting of iodine, hydriodic acid, oxalic acid, tin chloride, phthalic acid anhydride and zinc chloride, at a temperature sufficient to expell water and hydrochloric acid and thereby from 2,6-dichlorobenzamide.
2. The method of claim 1, wherein 1-hydroxy-2,2,6,6-tetrachloro-cyclohexane-carbonamide-1 is heated in a solvent.
3. The method of claim 2, wherein trichlorobenzene is used as the solvent.
4. The method of claim 1, wherein zinc chloride is used as the catalyst.

References Cited

UNITED STATES PATENTS 3,236,874  2/1966  Robinson et al. _____ 260—557

FOREIGN PATENTS 993,097  10/1951  France.
581,901  10/1946  Great Britain.

OTHER REFERENCES

Domnin: Chemical Abstracts, vol. 41, col. 5861 (1947), QD1. A51.

Domnin et al.: Chemical Abstracts, vol. 46, col. 6092 (1952), QD1. A51.

Reimschneider: Monatshefte für Chemie, vol. 85, pp. 417 to 423 (1954), QD1M73.

Wagner et al.: Synthetic Organic Chemistry, pp. 596 to 597, New York, Wiley, 1953. QD262. W24.

HENRY R. JILES, *Primary Examiner.*

NATALIE TROUSOF, *Assistant Examiner.*

U.S. Cl. X.R.

260—464, 465, 557

UNITED STATES PATENT OFFICE
CERTIFICATE OF CORRECTION

Patent No. 3,444,196                                               May 13, 1969

Cornelis Johannes Schoot

It is certified that error appears in the above identified patent and that said Letters Patent are hereby corrected as shown below:

Column 4, line 8, "from" should read -- form --.

Signed and sealed this 24th day of February 1970.

(SEAL)
Attest:

Edward M. Fletcher, Jr.                            WILLIAM E. SCHUYLER, JR.
Attesting Officer                                            Commissioner of Patents